Sept. 20, 1955    E. K. SHEAFFER    2,718,434
DEMOUNTABLE AUTOMOBILE WHEELS
Filed June 10, 1953    2 Sheets-Sheet 1

INVENTOR
EDWIN K. SHEAFFER

BY *[signature]*

ATTORNEY

Sept. 20, 1955     E. K. SHEAFFER     2,718,434
DEMOUNTABLE AUTOMOBILE WHEELS
Filed June 10, 1953     2 Sheets-Sheet 2
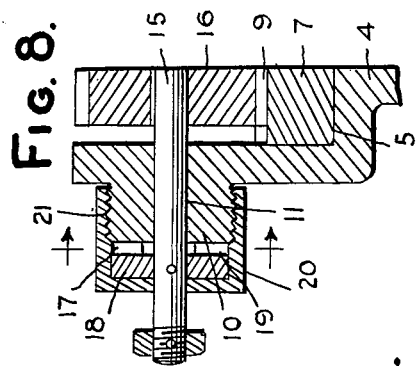
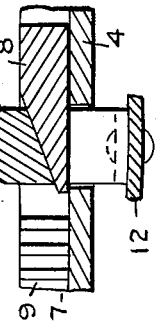
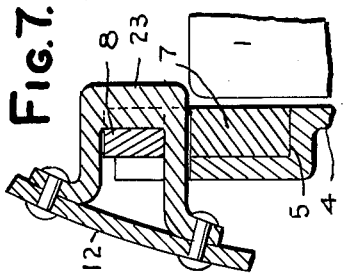
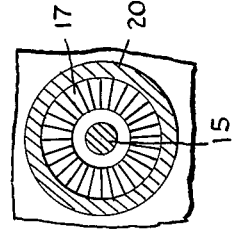
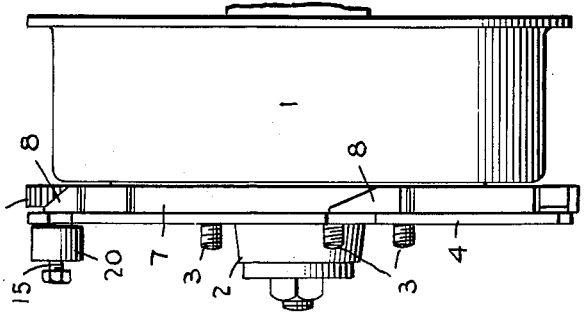
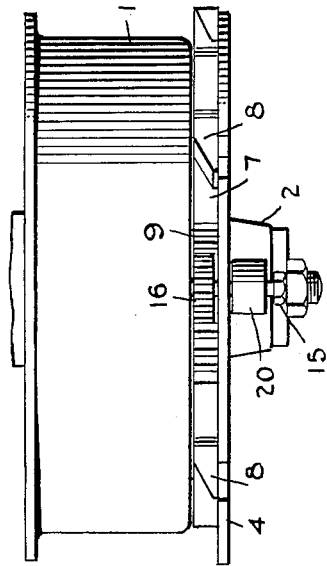
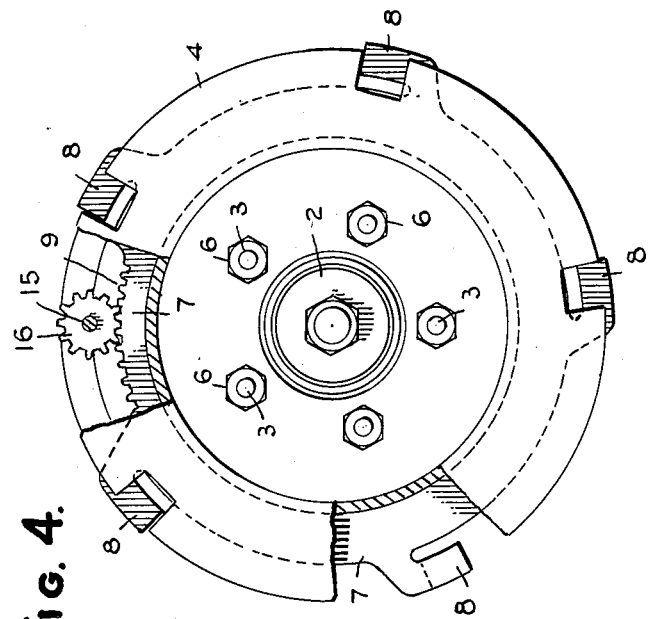
INVENTOR
EDWIN K. SHEAFFER
BY
ATTORNEY

United States Patent Office

2,718,434
Patented Sept. 20, 1955

2,718,434

DEMOUNTABLE AUTOMOBILE WHEELS

Edwin K. Sheaffer, Carrington, N. Dak.

Application June 10, 1953, Serial No. 360,685

2 Claims. (Cl. 301—9)

This invention relates to demountable automobile wheels, and it has for its principal object the provision of means for quickly demounting a wheel from the usual hub on the brake drum.

A further object of the invention is to provide a structure wherein the wheel and its rim or hub can be unlocked from the usual brake drum and can be removed without dislodging or removing of the means employed to secure the wheel to the brake drum.

A still further object of the invention is to so construct and arrange the actuating means on the brake drum so that in removing the wheel, the actuating mechanism remains intact on the drum.

A still further object of the invention is to mount an actuating interlocking ring on a track between the drum and a disc secured thereto.

These and other objects of the invention will be pointed out in the following specification and claims.

In the drawings:

Figure 3 is a top plan view.

Figure 4 is an elevation with parts broken away to illustrate part of the actuating means.

Figure 5 is an edge view with parts removed.

Figure 6 is a detail horizontal sectional view of the wedge interlock.

Figure 7 is a detail longitudinal sectional view of the wedge interlock.

Figure 8 is a detail section of the lock for securing the parts together.

Figure 9 is a detail of the lock.

Figure 1:
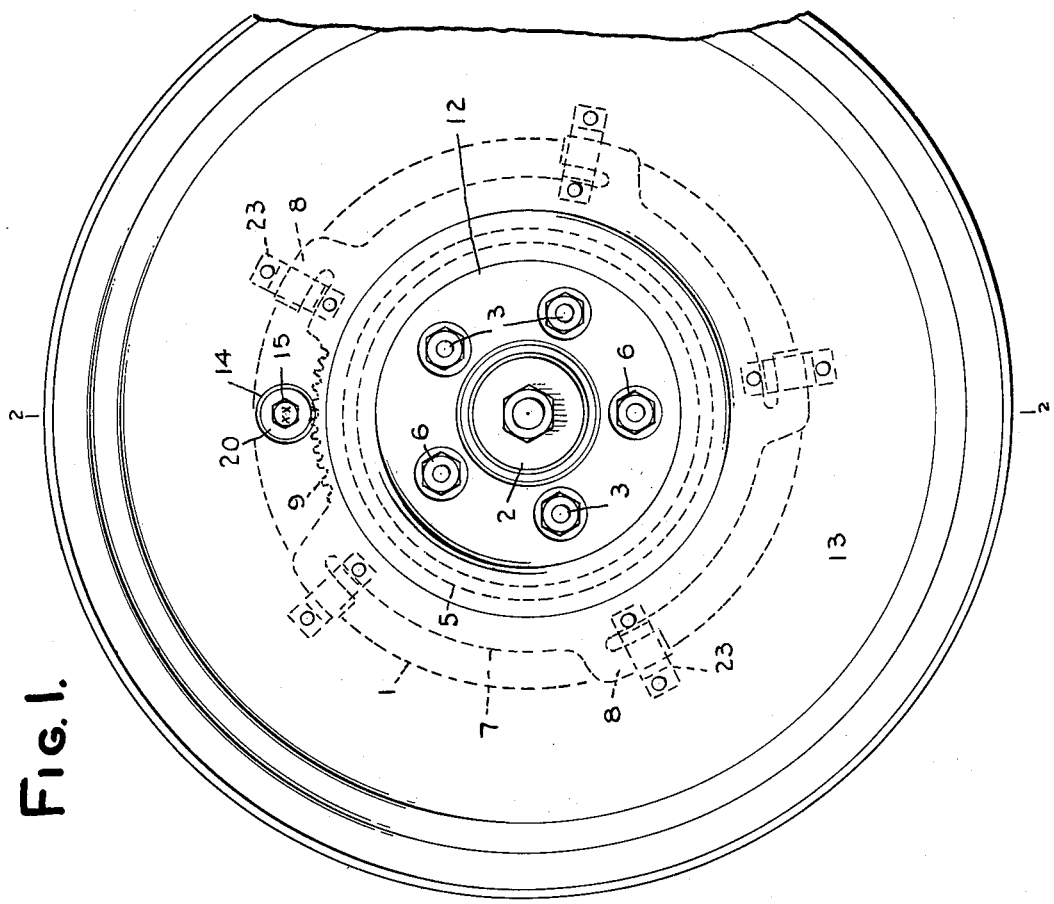
Figure 1 is an elevation of a wheel illustrating the application of the invention.

In the drawings, 1 represents a brake drum, and 2 a hub extending therefrom, the drum also having the usual wheel mounting studs 3 extending therefrom. Bolted to the outer face of the brake drum in place of the wheel is a disc 4, the outer portion of which is formed with a track 5, the disc being secured to the brake drum by the nuts 6 usually employed to secure the wheel to the hub.

Figure 2:
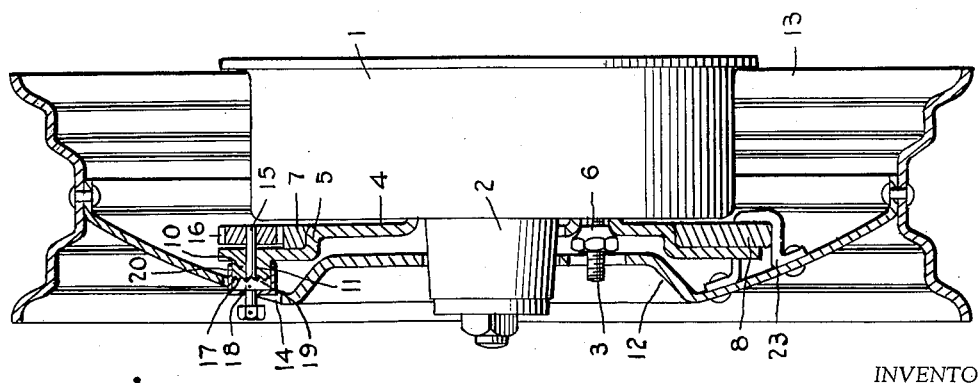
Figure 2 is a horizontal section on the line 2—2 of Figure 1.

Operating in the track 5 is a ring 7 provided on its periphery with a series of spaced-apart wedges 8 and a segment of gear teeth 9. The disc is formed with an outwardly extending lug 10, having a bore 11. Fitted over the disc 4 is the usual rim or hub 12 of a wheel 13, the rim being formed with an opening 14, through which projects the lug 10, as clearly shown in Figure 2.

Extending through the bore of the lug is a shaft 15, and on the inner end thereof is mounted a gear wheel 16 designed to mesh with the gear teeth 9. To lock the shaft, hence the ring 7, when the parts are assembled, the face of the lug 10 is formed with a series of radial corrugations 17, and adjacent the same is a disc or washer 18, secured to the shaft, and is formed on its face with a series of radial corrugations 19, which mesh with the corrugations 17.

A hollow interiorly threaded locking nut 20 is mounted on the lug 10, which is threaded at 21, and on which the hollow threaded lock nut 20 engages.

Extending inwardly from the face of the rim or hub 12 are spaced-apart beveled loops or eyes 23, designed to be engaged by the wedges 8, as will be hereinafter described.

In operation, the rim or hub 12 is slipped on the hub 2, the hub having a series of openings to fit over the studs 3, and the lug 10 passing through the opening 14 for the operator to have access to the free end of the bolt 15.

Of course, when mounting a wheel, there will be indicating marks x—x to indicate that the wedges 8 are in position to engage the loops or eyes 23, and assuming the shaft 15 has been adjusted to position the wedges, the rim 12 is slipped on the hub 2, and with a suitable tool, the shaft 15 is rotated, which rotates the gear 16 and in turn rotates the ring 7 and thereby forces the wedges into the loops or eyes 23. This action draws the rim 12 in close contact with the disc 4, and yet permits of the gears being sufficiently free to effect the wedging of the parts.

After the wedges have been engaged with the loops and the rim 12 is tightly clamped to the brake drum, and to effectively lock this binding action, the hollow threaded nut 20 is screwed on the lug, which drives the disc or washer 18 up against the face of the lug 10 until the corrugations 17, 19 mesh, which secures the wedges in the loops 23.

It is important to understand by the construction described that when removing a wheel, it is only necessary to release the lock, reverse the gear 16 to withdraw the wedges from the loops. Thus the essential working or actuating parts remain on the hub 2. Thus a wheel can be removed or mounted by a single operation, a vital factor in securing or removing the wheel.

Obviously, by the arrangement described, the wheel is securely held in place by the wedges 8 and loops 23 and is clamped by this action against the disc 4, while any jarring due to vibration likely to cause the intermeshing gears to release the grip of the wedges is effectively prevented by the locking of the shaft 15.

What I claim is:

1. In combination a brake drum, a disc demountably attached to the brake drum by a plurality of studs, a wheel rim having a series of openings to fit over the studs and a lock receiving opening, a series of beveled loops on the inside of the wheel rim, a track formed on the periphery of the disc, a ring mounted on the track, a plurality of wedges on the ring for engagement with the beveled loops, a lug on the disc, a shaft extending through the lug, a gear on the inner end of the shaft, a series of gear teeth on the ring with which the gear meshes; said shaft extending through the lock receiving opening to rotate the gear and the ring to engage or disengage the wedges with the loops, and means between the lug and the shaft to lock the shaft against turning.

2. A combination, as defined in claim 1, wherein the locking means consists of a series of radial grooves on the face of the lug, a washer on the shaft having a series of radial grooves to mesh with the radial grooves on the lug, the lug being externally threaded, and a threaded cap nut engaging the threaded end of the lug to force the washer in contact with the lug.

References Cited in the file of this patent

UNITED STATES PATENTS

| 1,353,511 | Baumgartl | Sept. 21, 1920 |
| 2,237,702 | Harrison | Apr. 8, 1941 |